US012749352B2

(12) United States Patent
Blais

(10) Patent No.: US 12,749,352 B2
(45) Date of Patent: Sep. 29, 2026

(54) INDICATORS FOR INDICATING WHETHER ENTRIES OF A REPRESENTATION FOR A VEHICLE ARE ACTIVE

(71) Applicant: BlackBerry Limited, Waterloo (CA)

(72) Inventor: Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 18/907,713

(22) Filed: Oct. 7, 2024

(65) Prior Publication Data

US 2025/0157268 A1 May 15, 2025

Related U.S. Application Data

(60) Provisional application No. 63/598,378, filed on Nov. 13, 2023.

(51) Int. Cl.
*G07C 5/08* (2006.01)
*G07C 5/00* (2006.01)

(52) U.S. Cl.
CPC ............... *G07C 5/08* (2013.01); *G07C 5/008* (2013.01)

(58) Field of Classification Search
CPC .................................. G07C 5/08; G07C 5/008
See application file for complete search history.

(56) References Cited

U.S. PATENT DOCUMENTS 11,854,318 B1 * 12/2023 Gregory ................ G06F 3/0481
2015/0375699 A1 * 12/2015 Lamprecht ............. G01C 21/36 701/2
2017/0011567 A1 * 1/2017 Eloy .................... G07C 5/0841
2017/0206576 A1 * 7/2017 Hunsaker ............ G06F 11/1469
2017/0287233 A1 * 10/2017 Nix ........................ G08G 1/166
2019/0322290 A1 10/2019 Van Hoecke
2021/0192867 A1 * 6/2021 Fang .................... G07C 5/0816
2021/0335063 A1 * 10/2021 Collins ................ G07C 5/0825
2023/0419743 A1 * 12/2023 Andreason ............ G07C 5/085

FOREIGN PATENT DOCUMENTS

CA 3212826 A1 4/2024

OTHER PUBLICATIONS

ISA/CA, PCT International Search Report and Written Opinion for International Appl. No. PCT/CA2024/051394 dated Jan. 21, 2025 (9 pages).
web.archive.org—Gibhub, Instances—Vehicle Signal Specification, May 19, 2023 (retrieved on Feb. 5, 2025) https://web.archive.org/web/20230519150343/https://covesa.github.io/vehicle_signal_specification/rule_set/instances/ (6 pages).

(Continued)

*Primary Examiner* — Anne Marie Antonucci
*Assistant Examiner* — Connor L Knight
(74) *Attorney, Agent, or Firm* — Conley Rose, P.C.; J. Robert Brown, Jr.

(57) ABSTRACT

A method is provided that includes a memory that stores a representation including entries that represent respective features of a vehicle. A first entry of the entries in the representation represents a first feature of the vehicle. The first entry is associated with an indicator settable to a first value to indicate that the first entry is active for the vehicle, and to a different second value to indicate that the first entry is inactive for the vehicle.

20 Claims, 6 Drawing Sheets

(56) References Cited

OTHER PUBLICATIONS web.archive.org—Github, Overlay—Vehicle Signal Specification, May 31, 2023 (retrieved on Feb. 5, 2025) https://web.archive.org/web/20230531194608/https://covesa.github.io/vehicle_signal_specification/rule_set/overlay/ (3 pages).

web.archive.org—Github, Basic Rules—Vehicle Signal Specification, May 31, 2023 (retrieved on Feb. 5, 2025) https://web.archive.org/web/20230531194344/https://covesa.github.io/vehicle_signal_specification/rule_set/basics/ (3 pages).

GITHUB.com—Overlay, Vehicle Signal Specification downloaded Nov. 3, 2023 (4 pages).

GITHUB.com—Overview, Vehicle Signal Specification downloaded Nov. 3, 2023 (3 pages).

* cited by examiner

INDICATORS FOR INDICATING WHETHER ENTRIES OF A REPRESENTATION FOR A VEHICLE ARE ACTIVE

CROSS-REFERENCE TO RELATED APPLICATION

This application claims the benefit under 35 U.S.C. § 119 (e) of U.S. Provisional Application No. 63/598,378, entitled "Indicators for Indicating Whether Entries of a Representation for a Vehicle Are Active," filed Nov. 13, 2023, which is hereby incorporated by reference in its entirety.

BACKGROUND

A vehicle can include various features, such as components in the vehicle, actuators or sensors associated with the components, data relating to the vehicle, or other types of features. Examples of components in the vehicle include a vehicle battery, a combustion engine, a transmission, brakes, tires, and so forth. The components of the vehicle may be associated with respective actuators or sensors. The actuators or sensors may be accessed by a processing entity that is within or external to the vehicle. For example, the processing entity may query the status of a component of the vehicle by obtaining a signal from a sensor, or the processing entity may issue a control signal to an actuator to manipulate a component of the vehicle.

BRIEF DESCRIPTION OF THE DRAWINGS

Some implementations of the present disclosure are described with respect to the following figures.

Figure 1:
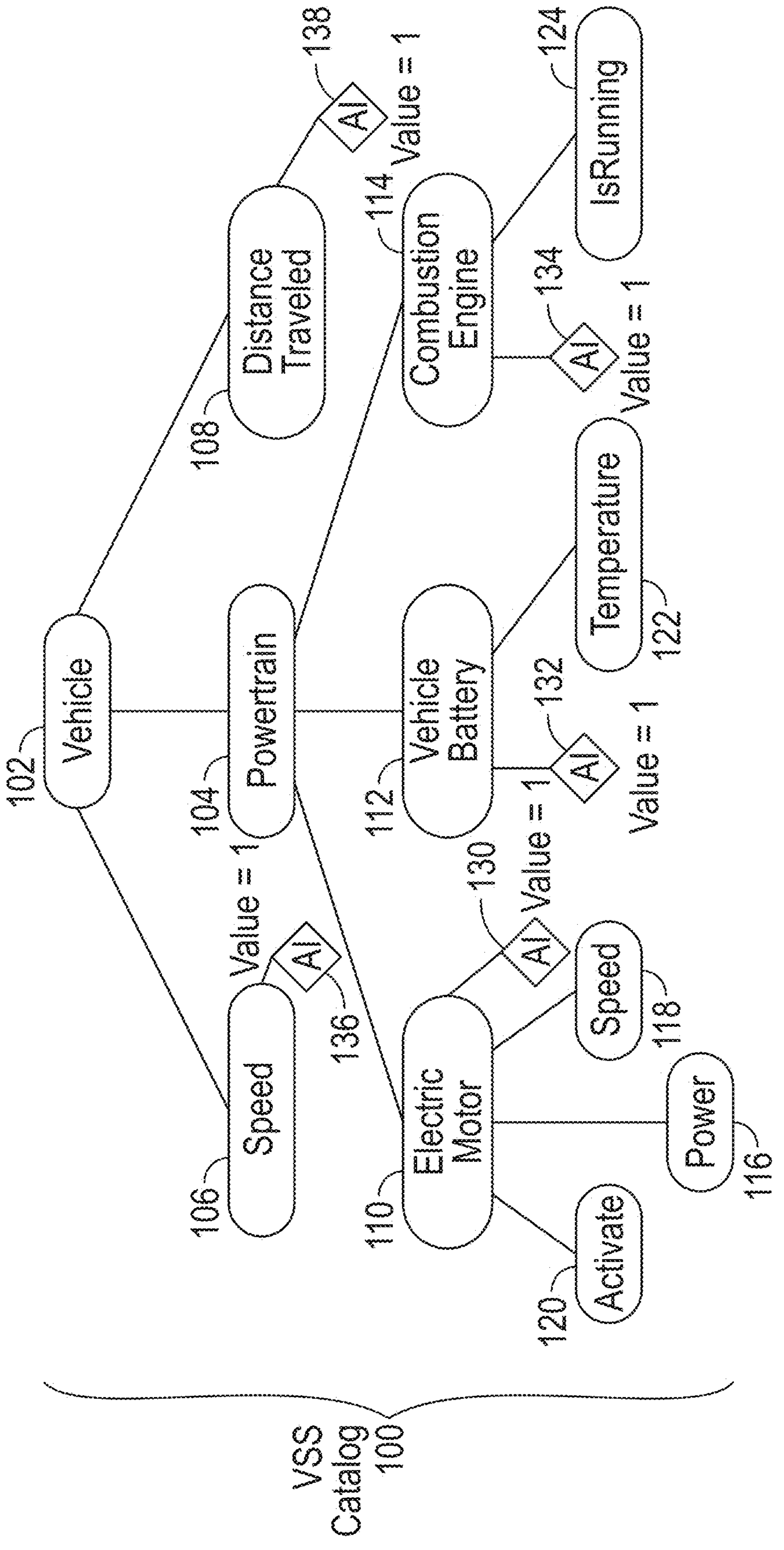
FIG. 1 is a block diagram of a signal catalog including active indicator elements according to some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Processing entities such as machines and programs are able to interact with features of vehicles, such as by obtaining states of signals from sensors or sending control signals to actuators. Such interactions involve an exchange of information in the vehicle.

To support such communications, a defined meronomy of vehicle information can be employed. The defined meronomy can be in the form of a representation of various components of a vehicle, actuators and sensors in the vehicle, and attributes of the vehicle. The defined meronomy identifies a collection of signals and attributes of the vehicle that are available to processing entities for purposes of performing operations with respect to the vehicle. The operations can include acquiring information about the vehicle, controlling various aspects of the vehicle, or other operations.

For example, an insurance company may have an electronic device plugged into an On-Board Diagnostics (OBD) port of a vehicle to monitor the driving habits of a driver. The electronic device may query sensors of the vehicle to obtain target information from the vehicle, and the electronic device can either record the obtained information or transmit the obtained information to a remote system. As another example, a computer in the vehicle can acquire information of the vehicle for the purpose of performing diagnostics for identifying potential problems with the vehicle. As a further example, a computer in the vehicle can control driving of the vehicle, such as when cruise control or autonomous driving is activated. To control the driving of the vehicle, the computer can acquire signal information from various sensors of the vehicle, and can control actuators of the vehicle to adjust the speed of the vehicle, to control the steering system of the vehicle, and so forth.

In some examples, the defined meronomy is according to the Vehicle Signal Specification (VSS) from the Connected VEhicle Systems Alliance (COVESA). VSS provides a catalog (referred to as a "VSS catalog" or a "signal catalog") that represents various features of vehicles, including components, actuators, sensors, and attributes. The VSS catalog is a hierarchical representation that includes nodes (arranged in a hierarchical form) representing respective features of vehicles. For example, the nodes of the VSS catalog can include a branch node, an actuator node, a sensor node, and an attribute node. A branch node represents a group of nodes, an actuator node represents read and write signals (such as read and write signals obtained from or sent to an actuator of a vehicle), a sensor node represents a read-only signal (such as a signal obtained from a sensor), and an attribute node represents an attribute. An attribute is typically a fixed value but may also be a one-way signal originating from a vehicle with an expectation that the value will change infrequently or be set only once per start cycle of the vehicle. A "start cycle" of a vehicle refers to a cycle when the vehicle is started from a powered off state.

Although reference is made to VSS in some examples, it is noted that techniques or mechanisms according to some implementations can be applied with other types of representations of features of vehicles. More generally, a VSS catalog is an example of a representation that includes entries representing respective features of a vehicle.

Once a node is included in a VSS catalog, it may not be possible or it may be difficult to delete the node from the VSS catalog. The VSS catalog is implemented with one or more specification files. A specification file of a VSS catalog is referred to as a "VSPEC file." A VSPEC file is according to the YAML Ain't Markup Language (YAML).

Making changes to source material (one or more VSPEC files) of a VSS catalog may trigger a requirement in the Mozilla Public License Version 1 (MPL V1) for distributing modified source material to others. This may not be desirable under certain circumstances.

Instead of making changes to the source material of a VSS catalog, the VSS also provides an overlay mechanism that allows changes or additions to be made with respect to the VSS catalog, without changing the source material of the VSS catalog. The overlay mechanism supports the creation of one or more overlay files (which themselves are VSPEC files) that contain instructions specifying changes to nodes of a VSS catalog, or specifying additions of nodes that are not present in the VSS catalog. An overlay file can be used to specify the addition of new key-value pairs as additional metadata (e.g., attributes) that are to be associated with one or more nodes of the VSS catalog. A key-value pair includes a key and a value assigned to the key. The key represents metadata (e.g., an attribute) that can be assigned the value.

Although the overlay mechanism can be used to change or add nodes and metadata to a VSS catalog, the overlay mechanism does not support deletion or removal of nodes or metadata from the VSS catalog.

In accordance with some implementations of the present disclosure, an active indicator element (in the form of a key-value pair or other metadata, for example) can be associated with any node of a VSS catalog to mark the node of the VSS catalog as either active or inactive. A node of a VSS catalog can be defined by a set of elements. The active indicator element for the node can be added to the existing set of elements for the node. Since this is an addition, it can be applied without changing the original VSPEC files by using the overlay mechanism.

A node that is marked active indicates that the node is present, supported, or used in the VSS catalog. The node being marked active specifies that a feature of a vehicle represented by the active node is present, supported, or used.

A node that is marked inactive indicates that the node should not be present, supported, or used in the VSS catalog. The node being marked inactive specifies that a feature represented by the inactive node is not present, supported, or used in the vehicle.

The active indicator element can be set to an active (true) value to indicate that a node is active or to an inactive (false) value (different from the active value) to indicate the node is inactive. For example, the active value can be "1" and the inactive value can be "0." Alternatively, the active value can be "0" and the inactive value can be "1." In other examples, the active and inactive values can be other values.

There are two general ways of associating active indicator elements with respective nodes of a VSS catalog (or more generally, with respective entries of a representation that represent various features of a vehicle). First, active indicator elements can be added to the VSS catalog (or more generally, to a representation of the features of the vehicle). Second, active indicator elements can be included in one or more overlay files to associate the active indicator elements with respective nodes of the VSS catalog (or more generally, active indicator elements can be included in a metadata structure to associate with entries of a representation that represent various features of a vehicle). A "metadata structure" can refer to a file, an object, or any other data structure that contains metadata to be associated with entries in a representation of features of a vehicle.

In some examples, techniques or mechanisms according to some implementations of the present disclosure improve the relevant technology of operating vehicles. The use of active indicator elements with representations of vehicle features allows processing entities such as machines or programs to interact with features of a vehicle that are present in the vehicle, such as for the purpose of controlling the driving of the vehicle (using a cruise control system or an autonomous driving system), controlling actuators of the vehicle (such as to adjust the speed or control the steering system of the vehicle), performing diagnostics of the vehicle to resolve issues of the features of the vehicle, and obtaining information from sensors to troubleshoot a condition of the vehicle.

FIG. 1 shows a portion of a VSS catalog 100 that includes a hierarchical arrangement of nodes representing respective features of a vehicle. Although a specific example arrangement of nodes is depicted in FIG. 1, in other examples, different arrangements of nodes can be employed in a VSS catalog.

A root node 102 represents the vehicle. Various nodes can depend from the root node 102 in the hierarchical arrangement of nodes. A first node "depends" from a second node in the hierarchical arrangement of nodes if the first node is connected to the second node and is at a lower hierarchical level in the hierarchical arrangement than the second node. The root node 102 is at the highest hierarchical level in the hierarchical arrangement.

Nodes depending from the root node 102 include a branch node 104 and sensor nodes 106 and 108. The sensor node 106 represents a signal from a sensor to measure a speed of the vehicle, and the sensor node 108 represents a signal from a sensor to measure a distance traveled by the vehicle.

The branch node 104 represents a powertrain of the vehicle. Further nodes depend from the powertrain branch node 104, including a branch node 110 that represents an electric motor, a branch node 112 that represents a vehicle battery to power the electric motor, and a branch node 114 that represents a combustion engine.

Nodes that depend from the electric motor branch node 110 include a sensor node 116 that represents a signal from a sensor that measures power delivered to the electric motor, a sensor node 118 that represents a signal from a sensor that measures speed of the electric motor, and an actuator node 120 that represents a signal of an actuator to activate the electric motor.

A sensor node 122 depends from the vehicle battery branch node 112. The sensor node 122 represents a signal from a sensor that measures a temperature of the vehicle battery.

A sensor node 124 depends from the combustion engine branch node 114. The sensor node 124 represents a signal from an IsRunning sensor that detects whether the combustion engine is running.

It is noted that additional nodes may be present in the hierarchical arrangement of nodes of the VSS catalog 100 of FIG. 1.

Depending on the type of vehicle, a combustion engine or an electric motor may not be present in the vehicle. A hybrid vehicle includes both a combustion engine and an electric motor (along with the vehicle battery that powers the electric motor). For the hybrid vehicle, the electric motor branch node 110, the vehicle battery branch node 112, and the combustion engine branch node 114 (along with all nodes depending from such nodes) would apply and thus should be present in the VSS catalog 100.

However, if the vehicle is a combustion engine vehicle, which does not have an electric motor and the associated vehicle battery, then the electric motor branch node 110 and the vehicle battery branch node 112 would not apply and should be removed from the VSS catalog 100. On the other hand, if the vehicle is an electric vehicle that is without a combustion engine, then the combustion engine branch node 114 would not apply and should be removed from the VSS catalog 100.

A processing entity that uses the VSS catalog 100 with all the nodes active would attempt to generate or process vehicle information (including signals) according to the nodes of the VSS catalog 100. For example, regardless of whether a given vehicle has a combustion engine or an electric motor (along with the associated vehicle battery), the processing entity would attempt to process vehicle information relating to the combustion engine, the electric motor, and the vehicle battery. For example, for a combustion engine vehicle, the processing entity may attempt to acquire electric motor and vehicle battery information based on the VSS catalog 100, even though the combustion engine vehicle does not include an electric vehicle and a vehicle battery. This can cause an error in the operation of the processing entity.

In accordance with some implementations of the present disclosure, assuming that the VSS is extended to support active indicator elements, an active indicator element can be added to any of the nodes of the VSS catalog 100. Extending the VSS to support active indicator elements refers to modifying the VSS to adopt use of active indicator elements.

In examples according to FIG. 1, an active indicator element 130 is added to the electric motor branch node 110, an active indicator element 132 is added to the vehicle battery branch node 112, and an active indicator element 134 is added to the combustion engine branch node 114. Note that additional active indicator elements may be added to other nodes in the VSS catalog 100, such as an active indicator element 136 added to the sensor node 106, and an active indicator element 138 added to the sensor node 108. Note that active indicator elements do not have to be added to all nodes of the VSS catalog 100. For example, adding an active indicator element to a branch node implies that nodes under the branch node are to be active or inactive based on the value of the active indicator element for the branch node. Active indicator elements are represented as diamonds in the figures to distinguish them from nodes of a VSS catalog.

Each active indicator element can be in the form of metadata (e.g., a key-value pair), where the key (active indicator) is settable to an active value (true) or an inactive value (false).

In some examples, the active indicator elements 130, 132, 134, 136, and 138 are by default each set to the active value in the VSS catalog 100 (e.g., Value=1). If a user or another entity desires to change an active indicator element to the inactive value, the user or other entity can provide an overlay file to change the value of the active indicator element to the inactive value (discussed in connection with FIG. 2 further below).

In different examples, the active indicator elements 130, 132, 134, 136, and 138 are by default each set to the inactive value in the VSS catalog 100 (e.g., Value=0). If a user or another entity desires to change an active indicator element to the active value, the user or other entity can provide an overlay file to change the value of the active indicator element to the active value.

Note that in some cases multiple overlay files may be used to change values of active indicator elements of the VSS catalog 100.

The active indicator element 130 being set to the active value (e.g., "1") specifies that the electric motor branch node 110 is active. However, the active indicator element 130 being set to the inactive value (e.g., "0") specifies that the electric motor branch node 110 is inactive. Specifying the electric motor branch node 110 is active implicitly means that any nodes (e.g., 116, 118, and 120) directly or indirectly under the electric motor branch node 110 are also active, unless such nodes are associated with their respective active indicator elements to specify whether such nodes are active or inactive. Specifying the electric motor branch node 110 is inactive implicitly means that any nodes (e.g., 116, 118, and 120) directly or indirectly under the electric motor branch node 110 are also inactive.

A first node is directly under a second node if the first node is connected to the second node in the hierarchical arrangement of nodes and the first node is a child of the second node. A third node is indirectly under the second node if the third node depends from another node that is a child of the second node. In the example of FIG. 1, the electric motor branch node 110 is directly under the powertrain branch node 104, the activate actuator node 120 is indirectly under the powertrain branch node 104.

The active indicator element 132 being set to the active value specifies that the vehicle battery branch node 112 is active. However, the active indicator element 132 being set to the inactive value specifies that the vehicle battery branch node 112 is inactive. Specifying the vehicle battery branch node 112 is active implicitly means that any nodes (e.g., 122) directly or indirectly under the vehicle battery branch node 112 are also active, unless such nodes are associated with their respective active indicator elements to specify whether such nodes are active or inactive. Specifying the vehicle battery branch node 112 is inactive implicitly means that any nodes (e.g., 122) directly or indirectly under the vehicle battery branch node 112 are also inactive.

The active indicator element 134 being set to the active value specifies that the combustion engine branch node 114 is active. However, the active indicator element 134 being set to the inactive value specifies that the combustion engine branch node 114 is inactive. Specifying the combustion engine branch node 114 is active implicitly means that any nodes (e.g., 124) directly or indirectly under the combustion engine branch node 114 are also active, unless such nodes are associated with their respective active indicator elements to specify whether such nodes are active or inactive. Specifying the combustion engine branch node 114 is inactive implicitly means that any nodes (e.g., 124) directly or indirectly under the combustion engine branch node 114 are also inactive.

The active indicator element 136 being set to the active value specifies that the vehicle speed sensor node 106 is active. However, the active indicator element 136 being set to the inactive value specifies that the vehicle speed sensor node 106 is inactive.

The active indicator element 138 being set to the active value specifies that the distance traveled sensor node 108 is active. However, the active indicator element 138 being set to the inactive value specifies that the distance traveled sensor node 108 is inactive.

For example, for a combustion engine vehicle, the active indicator element 130 and the active indicator element 132 would each be set to the inactive value, and the active indicator element 134 would be set to the active value. For an electric vehicle, the active indicator element 130 and the active indicator element 132 would each be set to the active value, and the active indicator element 134 would be set to the inactive value.

Each node of a VSS catalog is associated with a set of elements. For example, the set of elements of a data entry node (a "data entry node" can refer to a sensor node, an actuator node, or an attribute node) can include the following: a description of the node, a type of the node (sensor, actuator, attribute), a datatype (e.g., uint8, int8, uint16, double, string, etc.), an optional unit (e.g., km/h, mph, cm, rad, etc.), an optional minimum value, an optional maximum value, an optional set of allowed values, and other elements.

For example, a vehicle speed sensor node (e.g., 106 in FIG. 1) can include the following elements:

Description: Vehicle speed.
Type: sensor
Datatype: float
Unit: km/h.

In accordance with some examples of the present disclosure, the active indicator element can be added as another element in the set of elements, such as according to:

Description: Vehicle speed.
Type: sensor
Datatype: float
Unit: km/h.
Active Indicator: true.

As noted above, in some examples, the active indicator elements can by default be set to the active value (Value=1) in the VSS catalog 100. If a user or another entity desires to change an active indicator element to the inactive value, the user or other entity can provide an overlay file to change the value of the active indicator element to the inactive value.

Figure 2:
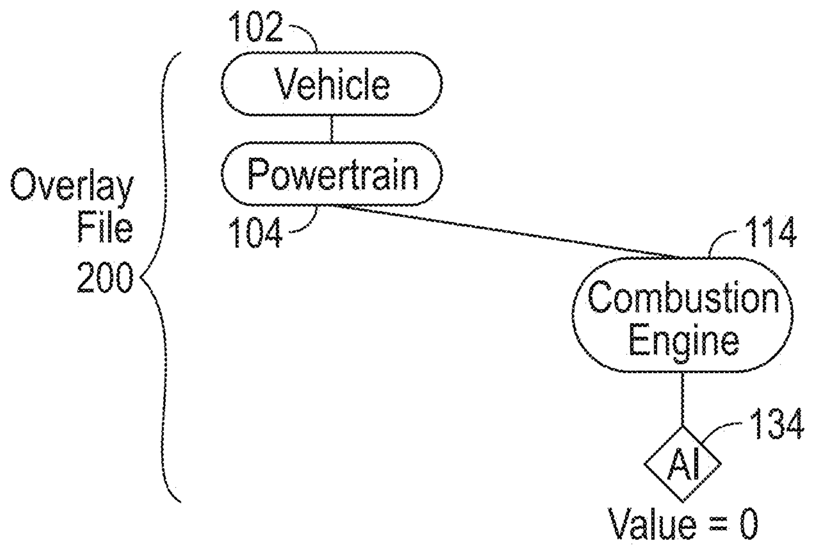
FIG. 2 is a block diagram of an overlay file to modify a value of an active indicator element, according to some examples of the present disclosure.

FIG. 2 shows an example of an overlay file 200 that changes the value of the active indicator element 134 to the inactive value (Value=0). The overlay file 200 is processed together in conjunction with the VSS catalog 100 to set values for the active indicator elements 130, 132, and 134. In this example, when the VSS catalog 100 and the overlay file 200 are considered together, the active indicator element 130 is set to the active value, the active indicator element 132 is set to the active value, and the active indicator element 134 is set to the inactive value.

Figure 3:
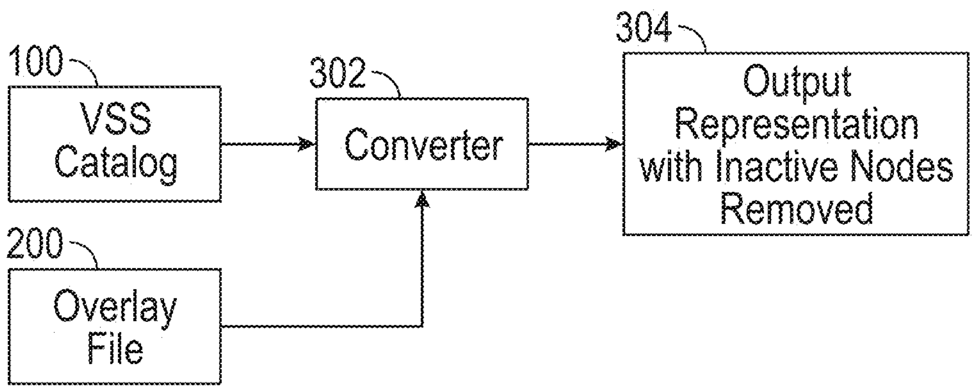
FIG. 3, FIG. 4, and FIG. 5 are block diagrams of example arrangements for processing signal catalogs based on values of active indicator elements, according to some examples of the present disclosure.

FIG. 3 shows an example of how the VSS catalog 100 and the overlay file 200 can be used. A converter 302 can convert the VSS catalog 100 and the overlay file 200 (which can be VSPEC files according to YAML, for example) to an output representation 304 in a different format, such as any of the following: a JavaScript Object Notation (JSON) format, Interface Definition Language (IDL) format, or any other format. The converter 302 can be a VSS tool that is provided as one of the tools associated with the VSS.

The converter 302 is configured to process any active indicator elements in the VSS catalog 100 and the overlay file 200. For each active indicator element in the VSS catalog 100 and the overlay file 200 encountered by the converter 202, the converter 202 determines whether the active indicator element is set to the active value or inactive value. As noted above, the VSS catalog 100 by default sets each active indicator element is set to the active value, and the overlay file 200 can change the value of an active indicator element (e.g., 134) to an inactive value.

If the active indicator element is set to the inactive value (by the overlay file 200), the converter 302 does not include the respective node (and any other nodes under the respective node) with which the active indicator element is associated in the output representation 304. If the active indicator element is set to the active value, the converter 302 includes the respective node (and any other nodes under the respective node) with which the active indicator element is associated in the output representation 304. Note that if any dependent node under the respective node is associated with its own active indicator element, the converter 302 would separately consider this other active indicator element for determining whether the dependent node should be included in the output representation 304.

The output representation 304 produced by the converter 302 is an output representation with inactive nodes (of the VSS catalog 100) removed, effectively resulting in the deletion of inactive nodes without requiring a change to the corresponding set of original VSPEC files.

In some examples, the converter 302 that applies the overlay file 200 to the VSS catalog 100 to produce the output representation 304 can be part of a system that is separate from a vehicle in which the output representation 304 is to be used. In such examples, an overlay file is applied to a VSS catalog prior to an output representation based on the VSS catalog and the overlay file being provided to the vehicle. In other examples, a vehicle can apply an overlay file to a VSS catalog (e.g., in such examples, the converter 302 may be part of the vehicle).

Figure 4:
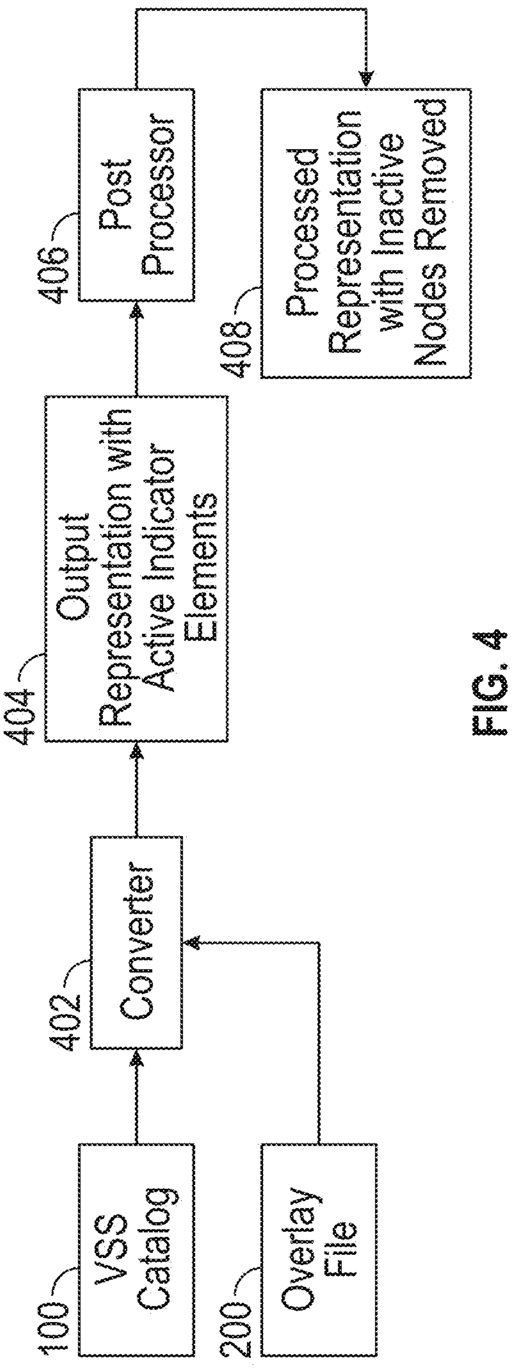

FIG. 4 shows another example of how active indicator elements in the VSS catalog 100 and the overlay file 200 can be processed. In the example of FIG. 4, a converter 402 (which may be a VSS tool) is not configured to process active indicator elements in the VSS catalog 100 and the overlay file 200. Rather, the converter 402 simply converts the nodes and any associated active indicator elements in the VSS catalog 100 (as modified by the overlay file 200) into an output representation 404 that includes the active indicator elements with values as set by the VSS catalog 100 and modified by the overlay file 200). In other words, regardless of whether an active indicator element is set to the active value or the inactive value, the converter 402 would simply add the active indicator element and its association with the respective node to the output representation 404. The output representation 404 would include the nodes of the VSS catalog 100 along with any associated active indicator elements with respective assigned values.

A post processor 406 (which can be a hardware processor or machine-readable instructions) can process the output representation 404. The post processor 406 is configured to process the active indicator elements in the output representation 404. Based on the output representation 404 and any active indicator elements in the output representation 404, the post processor 406 generates a processed representation 408 with inactive nodes removed.

For each active indicator element in the output representation 404 encountered by the post processor 406, the post processor 406 determines whether the active indicator element is set to the active value or inactive value. If the active indicator element is set to the inactive value, the post processor 406 does not include the respective node (and any other nodes under the respective node) with which the active indicator element is associated in the processed representation 408. If the active indicator element is set to the active value, the post processor 406 includes the respective node (and any other nodes under the respective node) with which the active indicator element is associated in the processed representation 408. Note that if any dependent node under the respective node is associated with its own active indicator element, the post processor 406 would separately consider this other active indicator element for determining whether the dependent node should be included in the processed representation 408.

In some examples, the converter 402 and the post processor 406 are part of a system separate from a vehicle. The separate system provides the processed representation 408 to the vehicle. In other examples, the converter 402 and the post processor 406 may be part of a vehicle. In further examples, the post processor 406 may be part of a vehicle, while the converter 402 is part of a separate system. In these latter examples, the system provides the output representation 404 to the vehicle for further processing by the post processor 406 in the vehicle.

Figure 5:
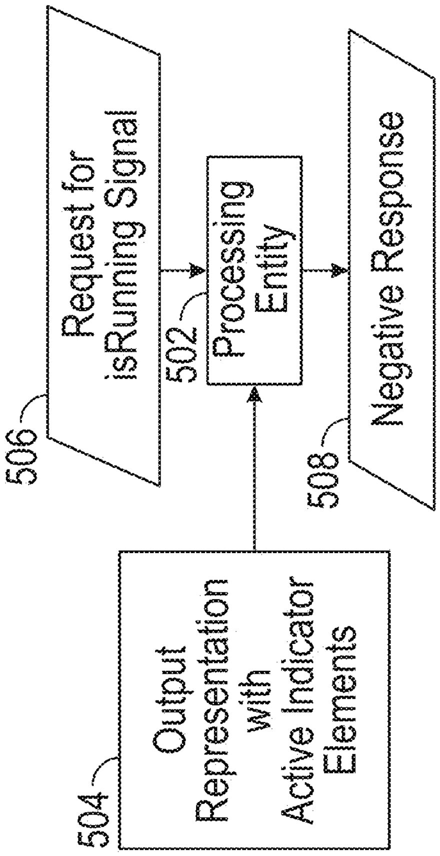

FIG. 5 shows yet another example of how active indicator elements can be processed. In FIG. 5, a processing entity 502 is configured to recognize the active indicator elements in an output representation 504 that includes active indicator elements set to respective active or inactive values. The output representation 504 may be produced by a converter similar to the converter 402 of FIG. 4, for example.

The processing entity 502 may be a hardware processor or a program. The processing entity 502 receives a request 506 for the IsRunning signal of the IsRunning sensor (represented by the sensor node 124 of FIG. 1 for example). However, since the overlay file 200 has set the active indicator element 134 to the inactive value, the IsRunning sensor is not present (which may be the case in an electric vehicle without a combustion engine that has an IsRunning sensor). The processing entity 502 detects that the active indicator element 134 in the output representation 504 is set to the inactive value. In response to determining that the active indicator element 134 is set to the inactive value, the processing entity 502 makes a determination that a positive response is not to be provided for the request 506. Instead, the processing entity 502 returns a negative response 508, which can include an error indication or an indication that the requested signal is unavailable.

In some examples, the processing entity 502 may be part of a vehicle. In other examples, the processing entity 502 may be in a system separate from the vehicle. Using the output representation 504 with the active indicator elements, the processing entity 502 can interact with features of the vehicle that are present in the vehicle, such as for the purpose of controlling the driving of the vehicle (using a cruise control system or an autonomous driving system), controlling actuators of the vehicle (such as to adjust the speed or control the steering system of the vehicle), performing diagnostics of the vehicle to resolve issues of the features of the vehicle, obtaining information from sensors to troubleshoot a condition of the vehicle, or for other purposes.

Figure 6A:
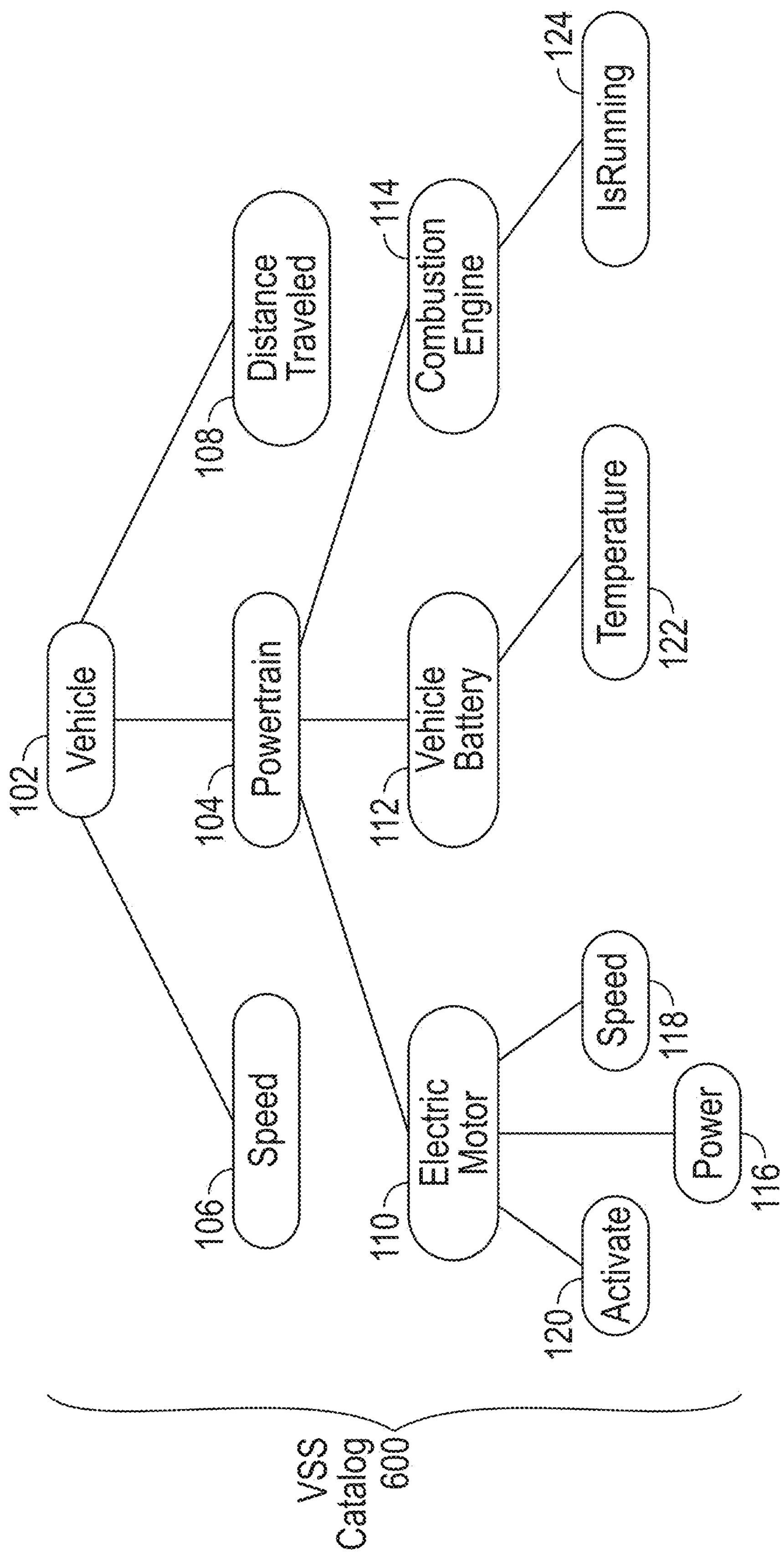
FIGS. 6A-6B depict a block diagram of a signal catalog and an overlay file that adds active indicator elements according to further examples of the present disclosure.
Figure 6B:
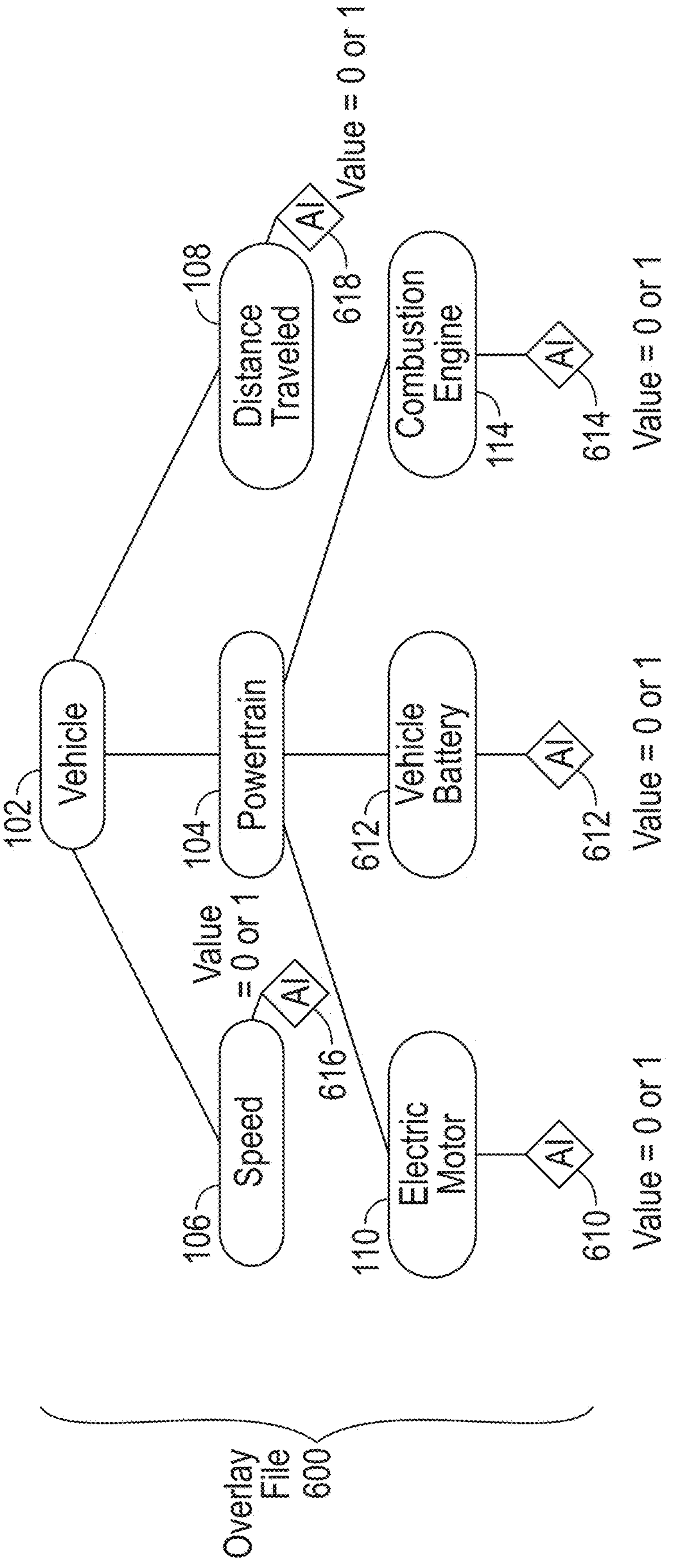

In other examples, the VSS may not be extended to support active indicator elements in a VSS catalog. In such examples, the overlay mechanism can be used instead to add active indicator elements to nodes of the VSS catalog. FIGS. 6A-6B show an example that includes a portion of a VSS catalog 600 that is without any active indicator elements. The nodes in the VSS catalog 600 are the same as corresponding nodes of the VSS catalog 100 of FIG. 1, except the VSS catalog 600 does not include any active indicator elements.

To support the use of active indicator elements, an overlay file 602 is provided to add active indicator elements to respective nodes of the VSS catalog 600. The overlay file 602 can be authored independently of the VSS catalog 600, and no changes would have to be made to the source material of the VSS catalog 600 to support the use of active indicator elements.

In the overlay file 602, an active indicator element 610 is added to the set of elements defining the electric motor branch node 110, an active indicator element 612 is added to the set of elements defining the vehicle battery branch node 112, an active indicator element 614 is added to the set of elements defining the combustion engine branch node 114, an active indicator element 616 is added to the set of elements defining the vehicle speed sensor node 106, and an active indicator element 618 is added to the set of elements defining the distance traveled sensor node 108. Each of the active indicator elements 610, 612, 614, 616, and 618 can be set to the active value or the inactive value to indicate whether or not the corresponding node is active or inactive.

Although FIGS. 6A-6B show an example with one overlay file 602, in other examples, multiple overlay files may be used to set values of active indicator elements. For example, a first overlay file may add a new active indicator element to a first node of the VSS catalog 600, and a second overlay file may add a new active indicator element to a second node of the VSS catalog 600. Also, a later created overlay file may modify a value of an active indicator element that was set in a prior overlay file.

The processing of the VSS catalog 600 and the overlay file 602 can be performed using mechanisms similar to those depicted in any of FIGS. 3-5.

Figure 7:
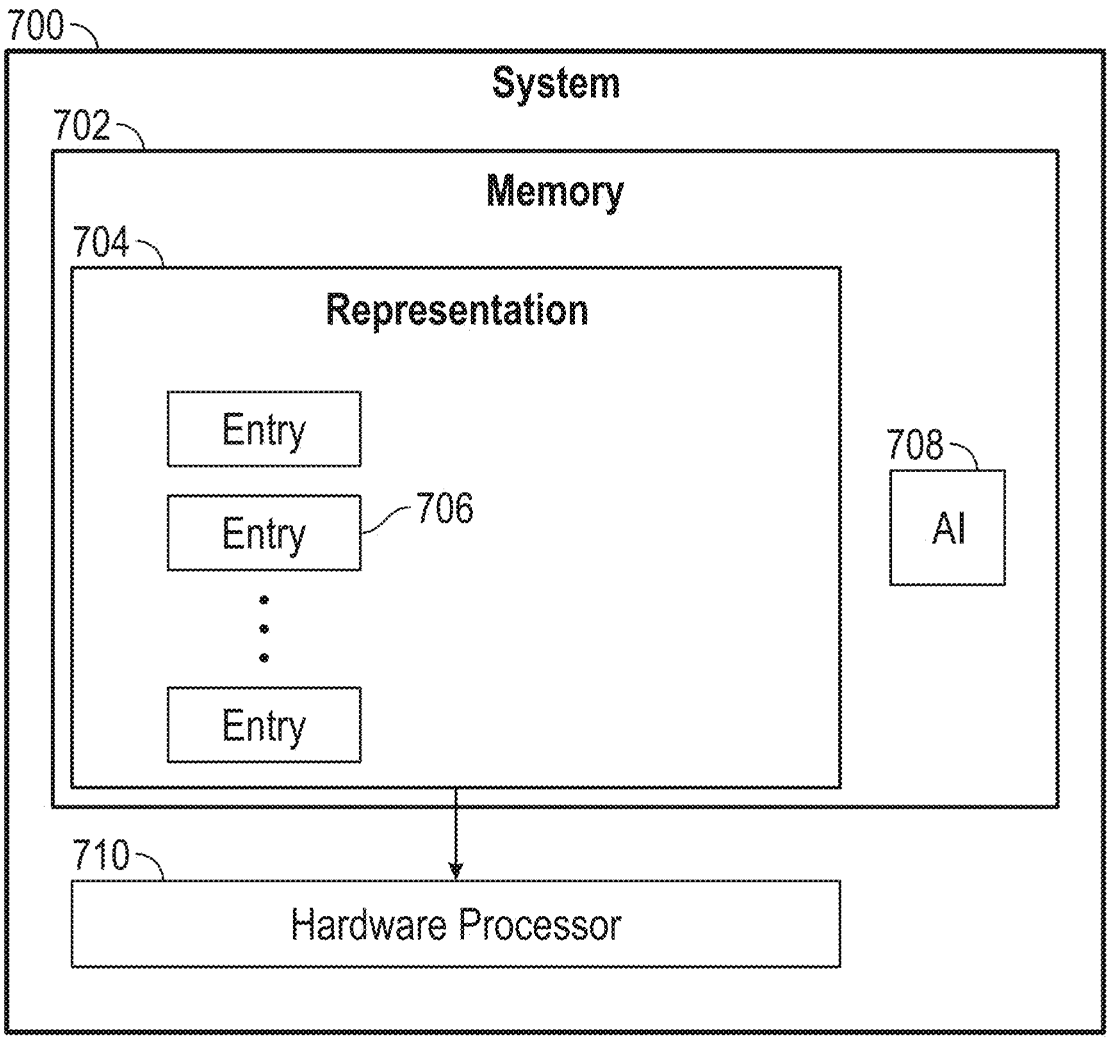
FIG. 7 is a block diagram of a system according to some examples of the present disclosure.

FIG. 7 is a block diagram of a system 700 according to some examples. The system 700 may include a vehicle or may include a computer separate from the vehicle.

The system 700 includes a memory 702 storing a representation 704 including entries that represent respective features of the vehicle. For example, the representation 704 can be a VSS catalog, and the entries of the representation 704 can be nodes of the VSS catalog.

A first entry 706 of the entries in the representation 704 represents a first feature of the vehicle, and the first entry 706 is associated with an active indicator element 708 settable to a first value to indicate that the first entry 706 is active for the vehicle, and to a different second value to indicate that the first entry 706 is inactive for the vehicle. In some examples, the representation 704 includes a hierarchical arrangement of nodes representing the respective features of the vehicle.

In some examples, the active indicator element 708 may be part of the representation 704 that sets the active indicator element 708 to a given value (the first value or the second value). In such examples, the memory 702 can further store a separate metadata structure (e.g., an overlay file) that includes a metadata element to modify the value of the active indicator element 708 to a value different from the given value. In examples where the system 700 is separate from a vehicle, the system first applies the metadata structure to the representation 704 prior to providing a resulting output representation to the vehicle. In other examples, it may be possible for the vehicle to apply the metadata structure to the representation 704.

In other examples, the active indicator element 708 is not present in the representation 704, but is included in a separate metadata structure (e.g., an overlay file). The separate metadata structure is able to add the active indicator element 708 as an element associated with the first entry of the representation 704.

In some examples, the overlay file supports an addition or modification of nodes or elements to the representation 704, but the overlay file does not support a deletion of nodes or elements from the representation 704.

In some examples, the metadata structure and the representation 704 are processed in conjunction to determine whether the first entry 706 of the representation 704 is active or inactive.

The system 700 further includes at least one hardware processor 710 configured to perform various tasks. A hardware processor can include a microprocessor, a core of a multi-core microprocessor, a microcontroller, a programmable integrated circuit, a programmable gate array, or another hardware processing circuit.

The at least one hardware processor 710 processes the representation 704, and disregards the first entry 706 based on detecting that the active indicator element 708 is set to the second value.

In some examples, the processing of the representation 704 includes converting the representation 704 into an output representation useable by a processing entity in performing an operation associated with the vehicle. In such examples, the disregarding of the first entry 706 involves not including the first entry 706 in the output representation as part of the converting.

In some examples, the processing of the representation 704 includes converting the representation into an output representation useable by a processing entity in performing an operation associated with the vehicle, where the output representation includes the active indicator element. In such examples, the disregarding of the first entry includes removing the first entry 706 from the output representation.

In some examples, the processing of the representation 704 and the disregarding of the first entry are performed by a processing entity that performs an operation with respect to the vehicle.

A storage medium that stores machine-readable instructions can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

storing, in a memory, a representation comprising entries that represent respective features of a vehicle, wherein a first entry of the entries in the representation represents a first feature of the vehicle, and the first entry is associated with an indicator settable to a first value to indicate that the first entry is active for the vehicle, and to a different second value to indicate that the first entry is inactive for the vehicle;

modifying, via an overlay file separate from the representation and without changing the representation, a value of first entry between the first value and the second value; and converting the representation into an output representation that omits from the output representation the first entry when the indicator is set to the second value indicating the first entry is inactive for the vehicle.

2. The method of claim 1, wherein the indicator is part of the representation.

3. The method of claim 2, wherein the representation comprising the entries comprises a hierarchical arrangement of nodes representing the respective features of the vehicle.

4. The method of claim 3, wherein the indicator is an element associated with a node of the hierarchical arrangement of nodes.

5. The method of claim 4, wherein the representation comprises a signal catalog according to a COnnected VEhicle Systems Alliance (COVESA) Vehicle Signal Specification (VSS).

6. The method of claim 2, wherein the indicator is set to the first value in the representation, the method comprising:

modifying a value of the indicator to the second value using a separate metadata structure.

7. The method of claim 1, wherein the indicator is part of a metadata structure comprising metadata entries to modify respective entries of the representation or to add entries for the representation, wherein the indicator is part of a first metadata entry of the metadata structure, the first metadata entry to associate the indicator with the first entry of the representation.

8. The method of claim 7, wherein the metadata structure comprises the overlay for the representation.

9. The method of claim 8, wherein the overlay supports an addition or modification of nodes or elements to the representation, and the overlay does not support a deletion of nodes or elements from the representation.

10. The method of claim 7, wherein the metadata structure and the representation are processed in conjunction to determine whether the first entry of the representation is active or inactive.

11. The method of claim 1, further comprising:

processing, by at least one processor, the representation comprising the entries that represent the respective features of the vehicle; and disregarding, by the at least one processor, the first entry based on detecting that the indicator is set to the second value.

12. The method of claim 11, wherein the processing of the representation comprises converting the representation into the output representation useable by a processing entity in performing an operation associated with the vehicle.

13. The method of claim 11, wherein the processing of the representation and the disregarding of the first entry are performed by a processing entity that performs an operation with respect to the vehicle.

14. The method of claim 1, wherein the representation comprises a vehicle signal catalog according to a Vehicle Signal Specification (VSS), implemented by one or more specification files, and wherein the indicator comprises an active indicator element comprising metadata associated with the first entry, the active indicator element having an active-state value and an inactive-state value corresponding to the first value and the second value.

15. A system comprising:

a memory storing a representation comprising entries that represent respective features of a vehicle, wherein a first entry of the entries in the representation represents a first feature of the vehicle, and the first entry is associated with an indicator settable to a first value to indicate that the first entry is active for the vehicle, and to a different second value to indicate that the first entry is inactive for the vehicle; and one or more processors coupled to the memory and configured to:

modify, via an overlay file separate from the representation and without changing the representation, a value of the first entry between the first value and the second value; and convert the representation into an output representation that omits from the output representation the first entry when the indicator is set to the second value indicating the first entry is inactive for the vehicle.

16. The system of claim 15, further comprising:

at least one processor configured to:

process the representation comprising the entries that represent the respective features of the vehicle; and disregard the first entry based on detecting that the indicator is set to the second value.

17. The system of claim 15, wherein the memory stores a metadata structure separate from the representation, the metadata structure comprising the indicator.

18. The system of claim 17, wherein the metadata structure adds the indicator that does not exist in the representation, and wherein the system comprises:

at least one processor configured to process the representation and the metadata structure to determine whether the first entry of the representation is to be removed.

19. The system of claim 17, wherein the metadata structure modifies a value of the indicator that is also present in the representation.

20. A non-transitory machine-readable storage medium comprising instructions that upon execution cause a system to:

access, in a memory, a representation comprising entries that represent respective features of a vehicle, wherein a first entry of the entries in the representation represents a first feature of the vehicle, and the first entry is associated with an indicator settable to a first value to indicate that the first entry is active for the vehicle, and to a different second value to indicate that the first entry is inactive for the vehicle;

modifying, via an overlay file separate from the representation and without changing the representation, a value of the first entry between the first value and the second value; and converting the representation into an output representation that omits from the output representation the first entry when the indicator is set to the second value indicating the first entry is inactive for the vehicle.

* * * * *